(12) United States Patent
Pozzi

(10) Patent No.: US 12,054,286 B2
(45) Date of Patent: Aug. 6, 2024

(54) METHODS AND SYSTEMS FOR LIGHTING A VERTICAL TAKE-OFF AND LANDING VEHICLE

(71) Applicant: Supernal, LLC, Washington, DC (US)

(72) Inventor: Alexander Pozzi, Carlsbad, CA (US)

(73) Assignee: Supernal, LLC, Washington, DC (US)

(*) Notice: Subject to any disclaimer, the term of this patent is extended or adjusted under 35 U.S.C. 154(b) by 0 days.

(21) Appl. No.: 18/349,831

(22) Filed: Jul. 10, 2023

(65) Prior Publication Data

US 2024/0140613 A1 May 2, 2024

Related U.S. Application Data

(60) Provisional application No. 63/381,527, filed on Oct. 28, 2022.

(51) Int. Cl.
| | |
|---|---|
| *B64D 47/06* | (2006.01) |
| *B60Q 3/54* | (2017.01) |
| *F21S 41/125* | (2018.01) |
| *F21S 41/151* | (2018.01) |
| *F21S 41/663* | (2018.01) |
| *H05B 47/13* | (2020.01) |
| *F21W 102/40* | (2018.01) |
| *F21W 103/60* | (2018.01) |
| *F21W 106/00* | (2018.01) |
| *F21W 107/30* | (2018.01) |

(52) U.S. Cl.
CPC .............. *B64D 47/06* (2013.01); *B60Q 3/54* (2017.02); *F21S 41/125* (2018.01); *F21S 41/151* (2018.01); *F21S 41/663* (2018.01); *H05B 47/13* (2020.01); *F21W 2102/40* (2018.01); *F21W 2103/60* (2018.01); *F21W 2106/00* (2018.01); *F21W 2107/30* (2018.01)

(58) Field of Classification Search
CPC ............... B64D 47/06; F21W 2107/30; B60Q 2400/50; H05B 47/115
See application file for complete search history.

(56) References Cited

U.S. PATENT DOCUMENTS

| | | | |
|---|---|---|---|
| 11,702,226 B2* | 7/2023 | Jung ...................... | B64D 47/06 340/945 |
| 2020/0156535 A1* | 5/2020 | Lee ........................ | B60Q 1/543 |

* cited by examiner

*Primary Examiner* — Robert J May

(74) *Attorney, Agent, or Firm* — Bookoff McAndrews, PLLC

(57) ABSTRACT

Systems and methods are disclosed for lighting a vehicle. A system includes a plurality of lights disposed on a vertical take-off and landing (VTOL) vehicle configured to turn on and off, change color, and/or change intensity. The system further includes a controller configured to determine a lighting scheme for the plurality of lights, the lighting scheme including a setting for the plurality of lights, the setting including one or more of turning the plurality of lights on or off, setting a color of the plurality of lights, and setting an intensity of the plurality of lights, determine a location in or associated with the VTOL vehicle, wherein the lighting scheme is configured to guide a person to the location, and transmit a signal to the one or more lights to execute the lighting scheme to guide the person to the determined location.

12 Claims, 13 Drawing Sheets

METHODS AND SYSTEMS FOR LIGHTING A VERTICAL TAKE-OFF AND LANDING VEHICLE

CROSS REFERENCE TO RELATED APPLICATIONS

This application claims priority to U.S. Provisional Application No. 63/381,527 filed Oct. 28, 2022, which is incorporated by reference herein in its entirety.

TECHNICAL FIELD

The present disclosure relates to vehicle lighting including configurations around vehicle seating, interiors, and equipment. In particular, the present disclosure relates to lighting schemes of vertical take-off and landing (VTOL) vehicles that guide individuals to or away locations of interest, and prevent interference with a vehicle operator.

BACKGROUND OF THE INVENTION

Loading and unloading a vehicle with cargo or passengers may be slow and/or unorganized without proper lighting. In an area with many vehicles (e.g., at a vertiport, which is a designated area that supports take-off and landing operations of vertical take-off and landing (VTOL) aircraft vehicles), it may be unclear which vehicle or which seat is assigned to a passenger. Additionally, maintenance or emergency personnel may be slow or unable to arrive at a location of interest without proper lighting. Traditional vehicles do not have advanced lighting schemes to help individuals arrive at a particular location associated with the vehicle.

Furthermore, lighting in a vehicle provides for aesthetic and practical needs, such as to provide visibility within the vehicle (e.g., when a vehicle is parked or in a steady state, or during travel). However, in certain situations, it is useful to minimize lighting within a vehicle that may reach an operator of the vehicle, such as to ensure an operator's vision or night vision is not impaired or the operator is not distracted.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the present disclosure, systems and methods are disclosed for lighting a vertical take-off and landing (VTOL) vehicle.

A lighting system for a vehicle includes a plurality of lights disposed on a VTOL vehicle, the plurality of lights configured to turn on and off, change color, and/or change intensity. The system also includes a controller configured to determine a lighting scheme for the plurality of lights, the lighting scheme including a setting for the plurality of lights, the setting including one or more of turning the plurality of lights on or off, setting a color of the plurality of lights, and setting an intensity of the plurality of lights. The controller is also configured to determine a location in or associated with the VTOL vehicle, wherein the lighting scheme is configured to guide a person to the location, and transmit a signal to the one or more lights to execute the lighting scheme to guide the person to the determined location.

In accordance with another embodiment, a method for controlling a light system for a vehicle includes receiving one or more signals indicating a first location associated with a VTOL vehicle, determining a second location associated with an individual, determining a lighting scheme for one or more lights of the VTOL vehicle, the lighting scheme configured to guide an individual from the second location toward the first location or away from the first location, transmitting the lighting scheme to the one or more lights of the VTOL vehicle, and executing the lighting scheme at the one or more lights of the VTOL vehicle to guide the individual from the second location toward or away from the first location.

In accordance with yet another embodiment, a lighting system for a VTOL vehicle includes a cabin having an interior and including two or more passenger seats in the interior of the cabin, a first light positioned in an aft portion of the interior, a second light positioned in a fore portion of the interior, and a controller configured to generate signals for controlling the first light and the second light, the controller further configured to automatically increase intensity of light generated by the first light and the second light based on increasing distance from the fore portion of the interior based on a flight mode of operation of the system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
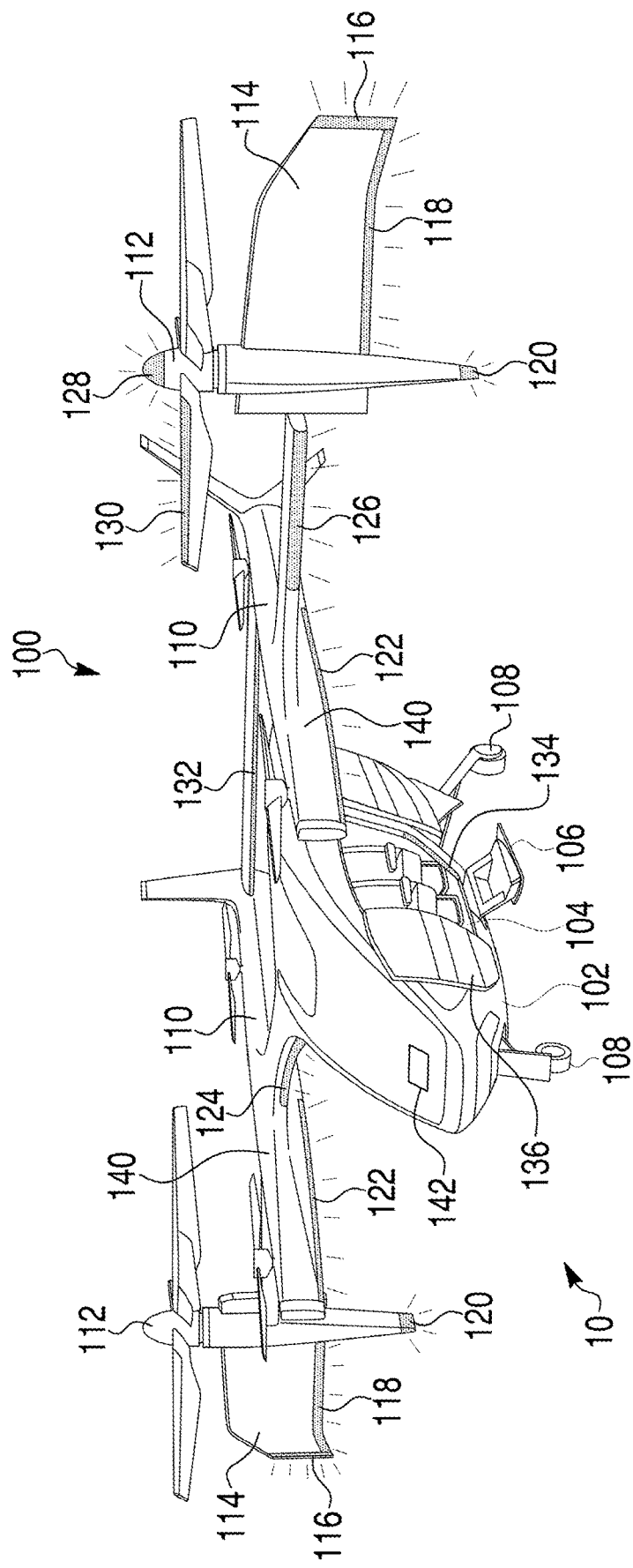
FIG. 1 illustrates a perspective view of an exemplary vehicle lighting system according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

The proposed embodiments disclosed herein include a vehicle lighting system for intuitive use and/or operation by passengers and/or operators of the vehicle. In an aircraft, for example, vehicle light configurations may help passengers and/or operators access their seats or different areas of the aircraft while the aircraft is parked or even while the aircraft is in motion or in flight. For example, in certain situations (e.g., passengers with hearing impairments or disabilities), it may be difficult or impossible to hear over moving machinery such as rotors or propellers, and thus lights may be used to direct movement of individuals. As another example, lighting may be used to optimize a loading and unloading experience.

The embodiments disclosed herein also provide lighting that can be used to provide specific types of aesthetics or "mood lighting" within the vehicle, while also being configured so as not to adversely affect the ability of operators to operate the vehicle. For example, the disclosed embodiments may be used to partition or separate portions of the vehicle interior—denoting passenger personal space, common areas, aisles, emergency exits, bathrooms, storage, and the like. In some embodiments, lights may display an identifier of an aircraft, such as a tail number or a number for ready identification by a passenger, operator, or air traffic control system. Some embodiments may use different lighting gradients, colors, or frequencies. In some embodiments, controlled lighting patterns may also be used to alert operators or crew members of areas of the vehicle that may require attention, and direct the operators or crew members to the location of the areas that require attention. Lights may be included on rotors or other parts to flag them for operators or maintenance crew or to highlight the vehicle. Lights disclosed may be aesthetically pleasing.

Thus, it may be helpful to optimally design a vehicle lighting system for a vehicle or aircraft to ensure visibility during a variety of tasks, including during normal operation as well as during docking/landing/take-off. Additionally, it may be helpful that a lighting system may be utilized to locate or identify parts of a vehicle during normal and/or abnormal operations, including, for example, assisting emergency crews locate passengers and cargo.

FIG. 1 illustrates an exemplary vehicle lighting system 10 according to one or more embodiments. Vehicle 100 may include a body 102. Body 102 may define a cabin 104 for carrying cargo and/or passengers. Vehicle 100 may include one or more doors 136 to access the cabin 104. Doors 136 may be on one or both sides of vehicle 100. Doors 136 may be sliding doors, gullwing doors, a hinged door, or any other door known to one of ordinary skill in the art. Vehicle 100 may include one or more stairs 106 used to assist passengers into and out of cabin 104 of vehicle 100. Stairs 106 may be part of vehicle 100 (e.g., folding down from cabin 104 or recess) or may be a part of a separate mechanism (e.g., automatically moving or manual stairs). Vehicle 100 may also include landing gear 108. In some embodiments, landing gear 108 may be retractable during flight and in other embodiments, landing gear 108 may be fixed.

In some embodiments, vehicle 100 may be a vertical take-off and landing (VTOL) vehicle, an aircraft, a helicopter, a boat, a car, or any other type of vehicle known to one of ordinary skill in the art. In some embodiments, vehicle 100 may be a high wing vehicle (as shown in FIG. 1) or a low wing vehicle. In some embodiments, vehicle 100 may include primary rotors 112 and secondary rotors 138. Primary rotors 112 may be proprotors that rotate from a generally vertical orientation (as shown) for take-off and landing to a generally horizontal orientation (e.g., for cruise). Secondary rotors may assist primarily during take-off or landing of vehicle 100, but may also assist in keeping the vehicle 100 airborne during flight. Vehicle 100 may also include fixed wings 110 and rotating wings 114. Fixed wings 110 may be wings that do not change orientation and are attached to body 102 of vehicle 100. Rotating wings 114 may have a vertical orientation during take-off or landing but may rotate to a substantially horizontal orientation during cruise.

Vehicle 100 may include a plurality of lights including lights 116, 118, 120, 122, 124, 126, 128, 130, 132, and 134. Further, each of lights 116-134 may include a plurality of lights (e.g., LEDs, bulbs, etc.). Each of lights 116-134 may include a series of individual lighting elements, the lighting elements being arranged in a row. In some embodiments, each of lights 116-134 may include a matrix (e.g., a grid) of lighting elements. Lights 116-134 as disclosed herein may include LEDs, lasers, incandescent bulbs, fluorescent lights, halogen lights, high-intensity discharge (HID) lights, neon lights, ultraviolet (UV) lights, infrared (IR) lights, xenon lights, OLED lights, plasma lights, fiber optics, displays, or any other light as would be known to one of ordinary skill in the art. In some embodiments, images instructions, pathways, colors, or patterns may be projected by lights 116-134 onto the ground or another surface (e.g., a surface of vehicle 100).

Lights 116, 118, and 120 may be positioned on rotating wings 114 and may perform various functions in accordance with embodiments disclosed herein. For example, lights 116 may be positioned on an end of rotating wings 114, furthest from body 102. Lights 118 may be positioned on a bottom portion of rotating wing 114 when wing 114 is in a takeoff or landing orientation, running along the bottom portion extending transversally away from lights 116 toward a nacelle of rotating wing 114. Lights 118 may be positioned in other portions of rotating wings 114 that are not represented in FIG. 1, including a top portion of rotating wings 114 or along a flat vertical surface of rotating wings 114. Lights 120 may be positioned at a tip of a nacelle housing a motor that drives primary rotors 112.

Lights 116 may be used for a variety of purposes while parked, during taxi, or during flight including as strobe lights (e.g., white anti-collision lights), navigation lights (e.g., position lights), beacon (e.g., red anti-collision) lights, etc. Lights 116 may also be used in accordance with one or more embodiments disclosed herein to guide individuals to locations in and/or around vehicle 100.

Lights 124 and 126 may be positioned on a bottom portion of fixed wings 110 that faces the ground when vehicle 100 is stationary on the ground. Lights 124 and 126 may also be positioned at a fore or at an aft portion of fixed wings 110.

Lights 122 may be positioned on a bottom portion of extended tail bars 140. Additionally or alternatively, lights 122 but may extend toward the top portion of extended tail bars 140.

Lights 132 may be positioned on a bottom or side portion of a rear tail connector connecting extended tail bars 140.

Lights 128 may be positioned at a tip of primary rotors 112 and lights 130 may be positioned on one or more blades attached to primary rotors 112. In some embodiments not shown in FIG. 1, the tip of primary rotors 112 and the blades attached to primary rotors 112 do not include lighting elements but may instead be illuminated by directing a light from another location (e.g., extended tail bars 140 or a tail of the vehicle 100) toward the rotor and the blades attached to the rotor, causing light to be reflected off the surfaces of the rotor and/or the blades.

Lights 134 may be positioned on a frame surrounding an opening defined by doors 136. In some embodiments, lights 134 may be visible only when doors 136 are open but in other embodiments, lights 134 may be positioned such that light from lights 134 is visible when doors 136 are closed. Lights 134 may surround substantially all of a doorway defined by doors 136. Even though not shown, lights may be positioned in any other location in or on vehicle 100 including on stairs 106, on landing gear 108, and on doors 136.

Lights 116-134 may be configured to turn off and on and/or change color or brightness (e.g., intensity). Lights 116-134 may be configured to direct or guide individuals to particular locations using a lighting scheme which includes patterns and/or sequences of turning on or off, setting (e.g., changing) a color of the lights, or setting (e.g., changing) an intensity of the lights. For example, lights 116-134 may be configured to direct passengers to one side of vehicle 100 or to a specific seat. Another example may include guiding emergency personnel to a location associated with an emergency and guiding passengers away from the location associated with the emergency. Yet another example may include guiding maintenance personnel to a damaged component of vehicle 100 that is in need of attention and/or repair. Furthermore, lights within an interior of the cabin 104 (e.g., lights discussed with reference to FIG. 2) may be used in combination with lights 116-134 of the exterior of the vehicle 100 to guide individuals to locations.

Lights 116-134 may be controlled by a controller 142 that sends signals to lights 116-134 to execute a lighting scheme which includes turning on or off, and setting or changing a color or intensity. The controller may be in communication with a mobile device of an individual, and in some cases, the signals sent to lights 116-134 may be based on communications received from or sent to the mobile device of the individual. For example, as described in more detail below with reference to FIGS. 5A and 5B, lights 116-134 may be configured to display a color that matches a color on a mobile device associated with a passenger. The passenger may be associated with the color through a physical or electronic boarding pass that has the same color, or an application on a mobile device, computer, or similar that demonstrates or conveys the light color, the light pattern, and/or aircraft number to the passenger (e.g., via an electronic boarding pass). In some embodiments, one or more of lights 116-134 may each include multiple lights, and the passenger may be associated with a number of lights or a pattern of lights that are on. For example, a passenger's boarding pass may indicate that they are to follow a pattern of two successive lights turned on alternating with one light turned on. In this case, lights 116-134 may be turned on to display the same pattern indicated to the passenger.

In some embodiments, lights 116-134 may be configured to warn passengers from going to one side of vehicle 100. For example, a lighting scheme may cause one of lights 116-134 to blink, blink red or another color, illuminate steadily in red or another color, or have an increasingly rapid blink as a person neared, using a proximity sensor or the like. In some cases, an operator or other authorized personnel may have a device (e.g., a smartphone) configured to communicate with the controller which allows them to access certain areas without the visual light warnings (e.g., without red blinking lights). In some embodiments, patterns or blinking lights as disclosed may be used for all passengers and/or passengers that have visual impairments (e.g., color blindness). Further, any combination of patterns, blinking, and/or colors may be used for all passengers and/or passengers that have hearing impairments (e.g., difficulty hearing in a loud environment, difficult discerning sounds, difficulty hearing, or similar).

In some embodiments, one or more lights 116-134 can direct passengers to open seating such as displaying red lights toward and around occupied or reserved seats and displaying green lights toward and around available seats. In some embodiments, one or more of lights 116-134 can pulse and/or have increasing intensity in a direction that a passenger should move (e.g., toward a door for ingress or away from a door for egress). Such an effect may create a perception of directionality for a passenger. In some embodiments, one or more lights 116-134 may indicate a path of travel.

Lights 116-134 or similar lights may execute a lighting scheme to direct passengers to seats or cargo areas, direct passengers away from an operating area, direct emergency crews toward a door or an injured person, direct maintenance crews toward a vehicle to be serviced, etc. For vehicles in high traffic areas or that utilize a single high traffic terminal, such as a single landing pad used by several VTOL vehicles, lights on vehicles may be configured to direct and coordinate service, emergency, and passenger movements to efficiently serve each passenger and/or each aircraft. For example, light colors or patterns may confirm that a passenger is at the correct aircraft and which door to enter.

In some embodiments, lights of vehicle 100 may match or be associated with colors of a pavement, heliport, ramp, pathway, or similar. In some embodiments, the pavement, heliport, ramp, pathway, or similar may include paint. The paint may be reflective, conductive, and/or configured to be charged by a current to make the paint glow. In some embodiments, the pavement, heliport, ramp, pathway, or similar may include lights that are configured to generate illumination with one or more colors, patterns, intensity, or blinking patterns associated with corresponding lights on the vehicle. For example, the same colors, patterns, intensity, or blinking may be simulated by lights on the vehicle and the pavement, heliport, ramp, pathway, or similar.

Figure 2:
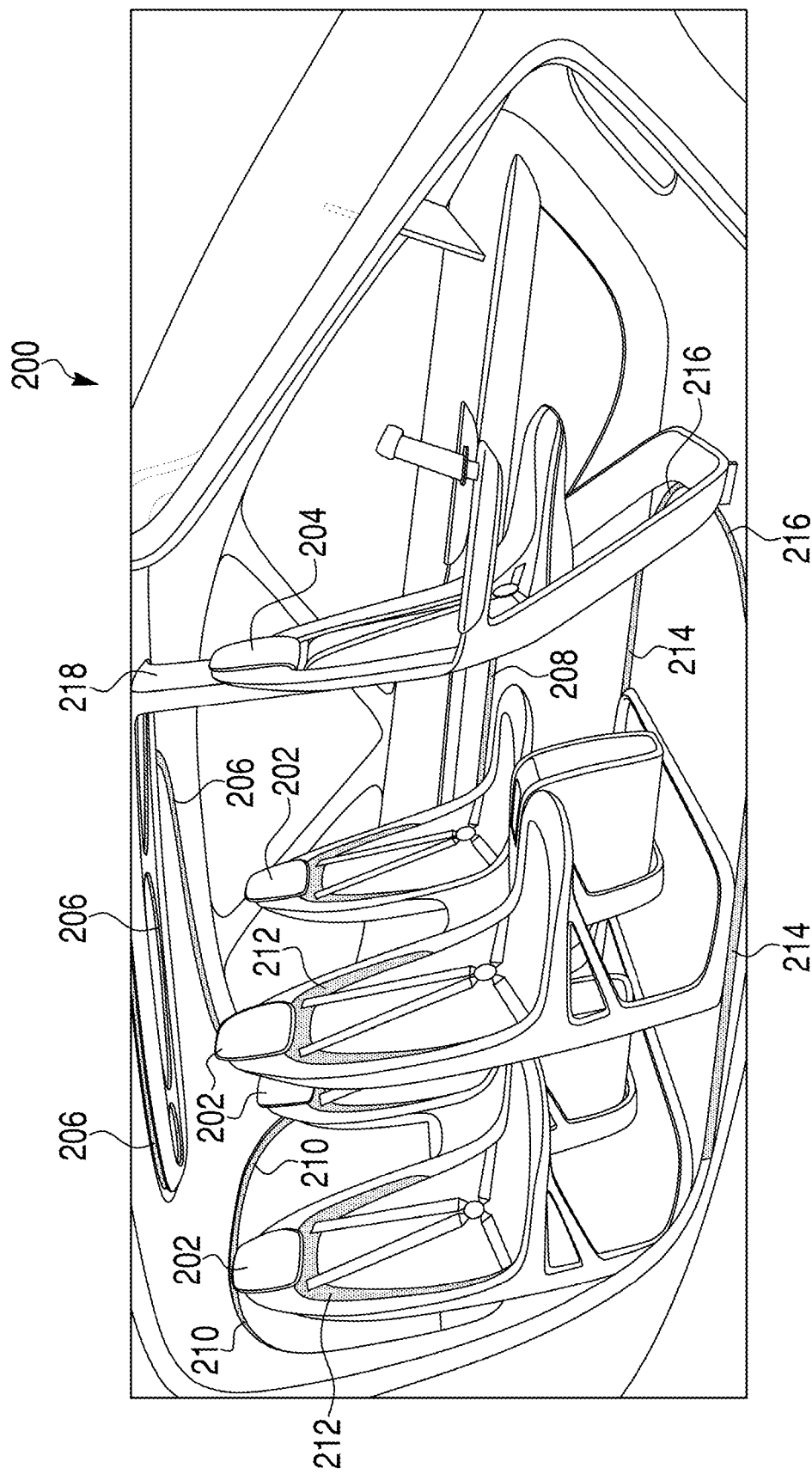
FIG. 2 illustrates a side view of an exemplary vehicle lighting configuration according to one or more embodiments.

FIG. 2 illustrates an exemplary vehicle lighting configuration according to one or more embodiments. Cabin 200 may be part of vehicle 100 of FIG. 1, for example, as part of body 102. Cabin 200 may include one or more passenger seats 202 and, in some embodiments, one or more operator seats 204. Cabin 200 may also include a plurality of lights 206, 208, 210, 212, 214, and 216. Each of lights 206-216 may include a plurality of lights having any of the forms or combination of forms described above.

Lights 206-216 may be positioned in one more recesses of the interior of cabin 200 such that the lights themselves are not visible, but only reflected light, light travelling through a light diffuser, and/or light travelling through a light guide is visible. Positioning lights within recesses may help to avoid glare and prevent direct light from reaching an operator of the vehicle 100 positioned in operator seat 204.

In one or more embodiments, lights 206 may be positioned on a ceiling of the interior of cabin 200 behind operator seat 204. Lights 208 may be positioned on a side of the interior of cabin 200. Lights 210 may be positioned behind seats 202 in an aft portion of the interior of cabin 200.

Lights 212 may be positioned in and/or around seats 202. For example, lights 212 may be positioned in recesses between a backrest and a headrest of seats 202.

Lights 214 may be positioned on a floor of the interior of cabin 200 abutting against the sides of the interior of cabin 200. Lights 214 may be under seats 202, in addition to or instead of lights 214 on the floor of cabin 200.

Lights 216 may be also positioned on the floor of the interior of cabin 200, but may extend across from one lateral side of cabin 200 to the other. Lights 216 may be positioned on the floor directly behind the operator seat 204.

Lights 206-216 may execute a lighting scheme to turn off and on and/or change color or brightness (e.g., intensity), and may be configured to guide individuals (e.g., passengers, operators, maintenance personnel, or emergency crews) to particular locations of interest. For example, lights 206-216 may be configured to direct passengers to one or more seats 202. In some embodiments, one or more of lights 206-216 may be configured to illuminate a seat with a color that matches a color associated with a passenger, as described in more detail below with reference to FIGS. 5A and 5B. In some embodiments, the passenger may be associated with the color through a physical or electronic boarding pass that has the same color, or an application on a mobile device, computer, or similar that can demonstrate or convey the color to the passenger. One of lights 206-216 may each include multiple lights, and the passenger may be associated with a number of lights or a pattern of lights that are on. Seats 202 may include sensors to determine whether seats 202 are occupied. A controller may receive communication from such sensors in order to direct passengers to unoccupied seats.

In some embodiments, one or more lights 206-216 and/or one or more lights around an operator (not shown) may execute a lighting scheme to direct emergency crews or service crews toward a passenger or area that needs assistance and/or give an indication that one or more passengers or areas does not require assistance. Lights 116-134 may also include this capability. In some embodiments, one or more lights 206-216, or lights around an operator may direct passengers and/or operator toward a door that is opened or capable of being opened and/or away from a door that is closed and/or incapable of being opened (e.g., blocked or damaged).

Lights 206-216 may be configured to automatically turn to a high (e.g., a predetermined) intensity setting when an aircraft is loading and unloading so that passengers and/or maintenance crew are able to see clearly. This visibility may help passengers collect and/or stow items in addition to helping the crew prepare and arrange the vehicle 100 for a next voyage. Lights 206-216 may be configured to automatically turn to a low (e.g., a predetermined) intensity setting when an aircraft is taking off, landing, on approach to an airfield, and/or at night. Lights 206-216 may be configured to turn on, increase or decrease intensity, and/or turn off for one or more of seats 202 or a set of seats 202 (e.g., upon request of the passenger seated in the one or more seats 202). Sets of seats 202 may be organized into zones, for example, so that passengers load on one side of cabin 200 first and then a second side of cabin 200. As another example, passengers may load a front row of cabin 200 or a back row of cabin 200 first.

In some embodiments, one or more of lights 206-216, and/or lights around an operator's seat may be configured to act alone or in concert to separate areas of an aircraft. For example, one or more lights 206-216 may include less intense (e.g., less bright) lighting at a ceiling of an interior, and one or more lights 206-216 may include more intense (e.g., brighter) lighting at a floor of an interior. In some embodiments, lights that face toward an operator (e.g., toward a fore portion of cabin 200) may be disposed on the floor to prevent light from reaching the operator. Conversely, lights that face away from an operator may be disposed on a ceiling to be functional for passengers, yet avoid distracting the operator. In some embodiments, more intense lighting may be toward an aft part of a vehicle interior (e.g., lights 210) and less intense lighting may be around an operator (e.g., lights 216). In some embodiments, lights described herein may generate illumination with one or more colors that separate an operator's area from a passenger's area. In some embodiments, operator's areas may be demarcated or surrounded with red light (e.g., from a floor) to allow for better night vision for the operator and/or to warn passengers away from the operator's area. Lights may be directed by use of shades, blinds, or structures, for example, away from an operator area and toward a passenger area. Lights may be shaped to illuminate specific areas such as around passengers and/or away from an operator area.

Lights inside cabin 200 may be arranged between passengers and/or an operator such as in a line on one or more of a ceiling, a floor, a wall either along an aircraft or across an aircraft interior. In some embodiments, demarcation with intensity of lights and/or colors may create an illusion of a physical separation without the need for a wall or other physical separation.

In some embodiments, where some lights are more intense and/or colorful, and other lights are less intense and/or colorful, the lights may include a gradient. The gradient may create a mood lighting and/or may be used to accentuate a screen that is being used by one or more passengers (for example, a screen built into the vehicle, or a personal entertainment screen which may be connected to, or detected by, the vehicle's lighting system using any known technique). Gradients may be used to create a holistic effect and/or to direct passenger attention to where lights are more intense. In some embodiments, lighting may be configured to calm passengers (e.g., cool tones) or to wake up or excite passengers (e.g., warm tones). Ceiling to floor gradient lighting may be configured to influence passengers holistically because the light in a large part of the passenger's field of view rather than only on a ceiling and/or only on a floor.

In some embodiments, ceiling lights 206 may be configured to extend over all seats 202 or may be individual lights over individual seats 202. In some embodiments, surface 218 may keep lights 206, 208, 210, and 212 from affecting an operator, for example sitting in operator seat 204. Lights 206-216 may be recessed to that light does not directly impact one or more windows, for example to reduce glare or affecting the operator. One or more of an operator's lights may have a red shift to eliminate or reduce glare for the operator for example when viewing outside or viewing one or more screens. An operator's lights may be positioned on the floor so that less glare reach an operator's screens.

Figure 3:
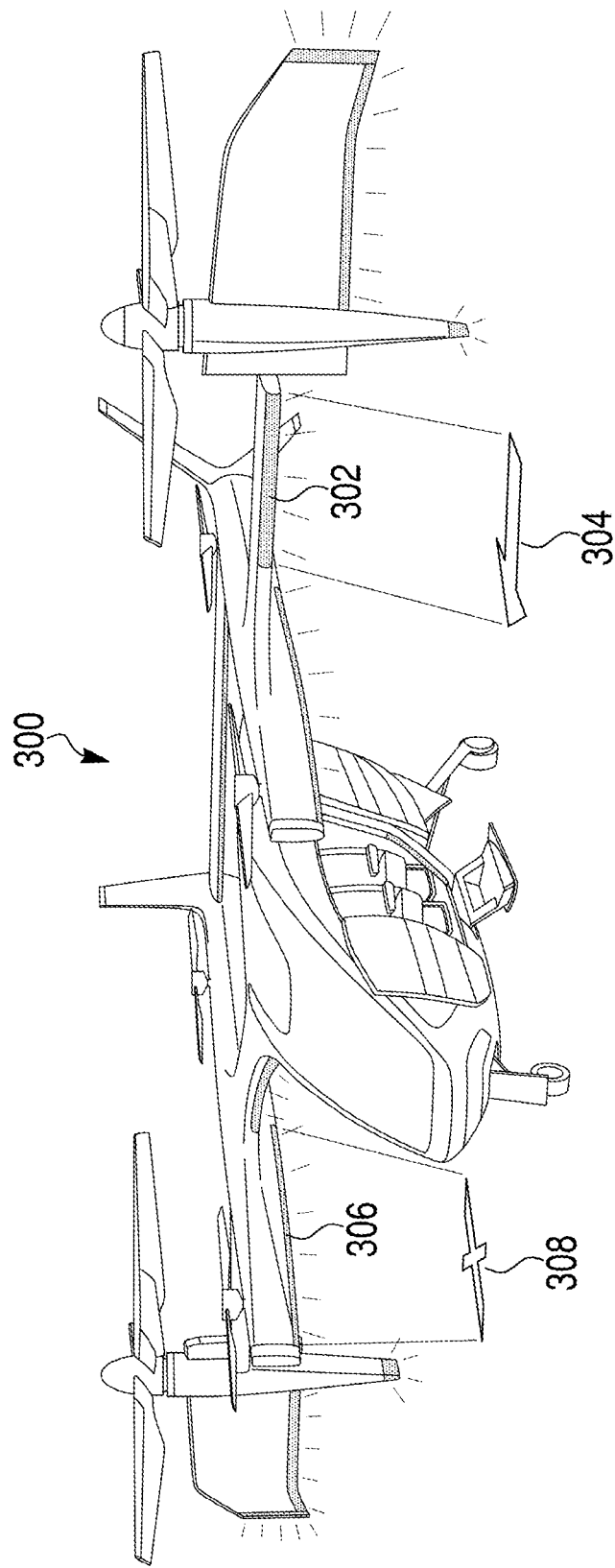
FIG. 3 illustrates a perspective view of an exemplary vehicle with lights that project images, in accordance with one or more embodiments.

FIG. 3 illustrates a vehicle 300 with lights that project images, in accordance with one or more embodiments. Vehicle 300 may be an example of vehicle 100 and may include all the features and lights of vehicle 100, although not all lights may be shown or discussed with reference to FIG. 3.

In FIG. 3, vehicle 300 may include lights 302 and lights 306, among other lights, which have capabilities of projection. Lights 302 and lights 306 may be configured to execute a lighting scheme to project images 304 and 308 on a ground below vehicle 300 or another surface (e.g., a surface of vehicle 300). In some embodiments, images 304 and 308 may be low-resolution images that indicate with a low-resolution arrow projected on the ground indicating a direction for individuals to follow. Images 304 and 308 may also be high-resolution images that include words, numbers, or other instructions for an individual to follow that will guide the individual to a particular location of interest. For example, a passenger may be guided to their seat by reading instructions projected on the ground and/or following one or more arrows projected on the ground indicating a direction that the passenger should follow to arrive at their assigned seat. In some cases, lights 302 may project image 304 (e.g., an arrow) and instructions to guide passengers to open seats while lights 306 guide passengers away from occupied seats with projected image 308 (e.g., an "X" or other similar symbol to indicate a wrong direction). Image 304 may also be an aircraft identification number to aid passengers in identifying the correct vehicle to board. Colors may be used to further indicate a path to follow. For example, image 304 may be a green arrow, while image 308 may be a red "X." Further, maintenance personnel may be guided to malfunctioning components of the vehicle 300 with colors, images, and/or text projected on the ground indicating which component is malfunctioning.

Lights 302 and 306 may include light sources such as lamps or LEDs, and optics to focus and direct the light from the light sources to generate an image. Lights 302 and 306 may include one or more projection technologies including Liquid Crystal Display (LCD), Digital Light Processing (DLP), and Liquid Crystal on Silicon (LCoS) technologies. Accordingly, lights 302 and 306 may include liquid crystal panels, mirrors, or liquid crystals to generate and project images onto a surface, such as the ground.

Figure 4:
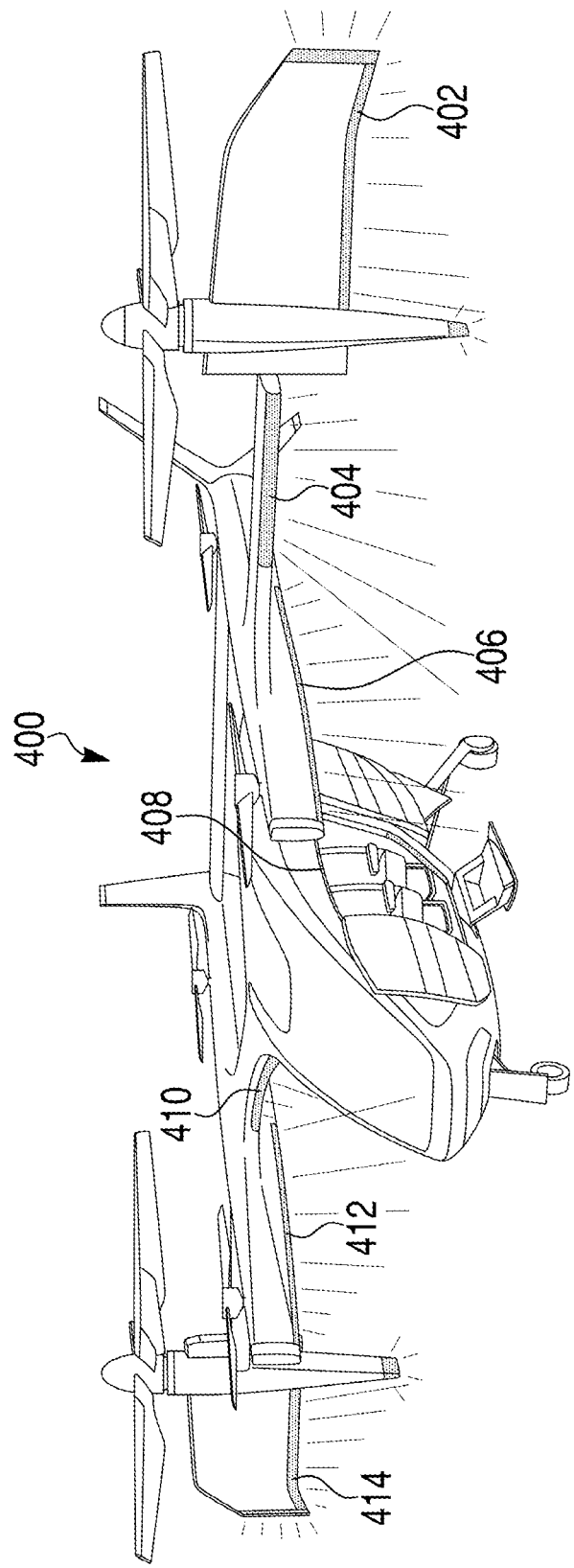
FIG. 4 illustrates a perspective view of an exemplary vehicle with lights that increase in intensity to guide individuals to locations of interest, in accordance with one or more embodiments.

FIG. 4 illustrates a vehicle 400 with lights that increase in intensity to guide individuals to locations of interest, in accordance with one or more embodiments. Vehicle 400 may be an example of vehicle 100 and may include all the features and lights of vehicle 100, although not all lights may be shown or discussed with reference to FIG. 4. For example, as shown in FIG. 4, vehicle 400 may include lights 402-414 which are configured to execute a lighting scheme to increase in intensity with decreasing distance to a particular location of interest. For example, the brightest (e.g., most intense) lights may be the lights nearest to the door/opening of vehicle 400 (e.g., lights 408 or 410) and the dimmest (e.g., least intense) lights may be the lights farthest from the door/opening of vehicle 400 (e.g., lights 402 or 414). In some embodiments, all lights within an individual set of lights (e.g., lights 402) are the same intensity and the difference in intensity exists only between lights 402 and another set of lights, such as lights 404. In one or more embodiments, each set of lights (e.g., lights 402, lights 404, lights 406, etc.) may be configured such that individual lights within each set of lights has a different intensity than another individual light within the same set of lights. For example, individual lights of lights 404 may be more intense nearer to the door and may be less intense according to an increasing distance from the door of vehicle 400.

Lights 402-414 may execute a lighting scheme to pulse or blink in a sequence such that an individual may perceive a direction to follow. For example, to guide a passenger toward an open door of vehicle 400, lights 402 may pulse, followed by lights 404, then by lights 406, and finally lights 408 may pulse. Each pulse may be slow or rapid, depending on a desired visual result (e.g., rapid pulses may appear more movement-like or fluid-like). Individual lights within each set of lights (e.g., lights 402, lights 404, lights 406, etc.) may also pulse in a similar sequence to generate the appearance of a light that is moving toward the door, guiding a passenger to the door.

Figure 5A:
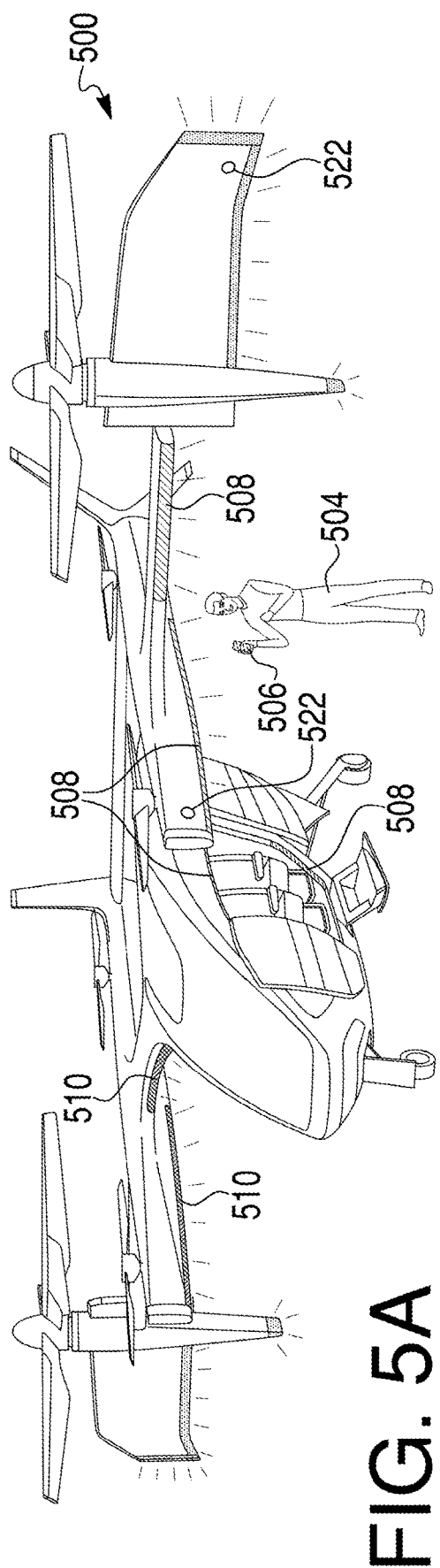
FIGS. 5A and 5B illustrate perspective and side views, respectively, of an exemplary vehicle with lights that guide a passenger to a seat in a cabin, in accordance with one or more embodiments.
Figure 5B:
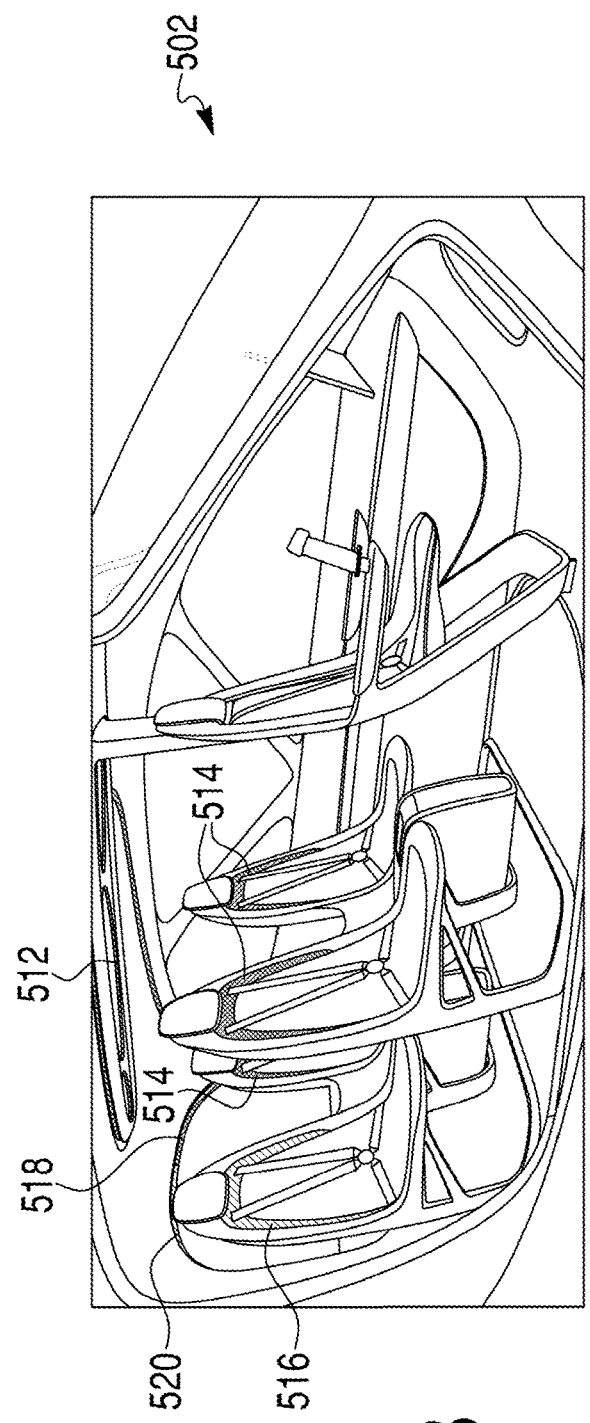

FIGS. 5A and 5B illustrate an exemplary vehicle 500 with lights that guide a passenger to a seat in a cabin 502, in accordance with one or more embodiments. Vehicle 500 may be an example of vehicle 100 and may include all the features and lights of vehicle 100, although not all lights may be shown or discussed with reference to FIGS. 5A and 5B. For example, as shown in FIG. 5A, vehicle 500 may include lights 508 and 510, which are configured to execute a lighting scheme to guide a passenger 504 to an assigned seat, and away from other seats. FIG. 5B shows cabin 502, which includes lights 512, 514, 516, 518, and 520, which are also configured to guide passenger 504 to an assigned seat, and away from other seats.

A passenger 504 may have a mobile device 506 which includes a boarding pass/ticket to board vehicle 500. The boarding pass on mobile device 506 may be electronically issued by a carrier that operates vehicle 500 or it may be electronically issued by a third party. The boarding pass may include an assigned seat that is assigned at the time of purchase, at the time of check-in, or at some other time. The boarding pass, or other application on mobile device 506, may include a color or pattern that matches a color or pattern displayed by lights 508-520. In some cases, the boarding pass may be a paper boarding pass, and may be printed at check-in or at some point prior to boarding the vehicle 500. Vehicle 500 may include a controller that determines a seating location for a particular passenger and a color that is to match the color on the boarding pass or application. In some embodiments, the controller receives both the assigned seating location and the matching color or pattern from the service that issued the boarding pass. In other embodiments, the controller receives only the assigned seating location, and the controller determines a color that will be displayed on the passenger's boarding pass (e.g., electronic or paper boarding pass). The controller may send the determined color to the service that issued the boarding pass such that the color is displayed on the boarding pass. The controller also sends signals to one or more lights 508-520 to guide the way to the assigned seat for the passenger.

Vehicle 500 may include sensors 522 that sense a passenger approaching. Sensors 522 may include light sensors, ultrasonic proximity sensors, infrared (IR) proximity sensors, capacitive proximity sensors, time-of-flight sensors, passive IR detectors, visual sensors, motion detectors, or any sensor that may detect the presence of an individual. The location(s) of sensors 522 is not limited to the example locations shown in FIG. 5 but may be placed in any suitable location on vehicle 500. As a passenger approaches vehicle 500, the controller may determine which color to display by transmitting signals to each of lights 508-520 to execute a lighting scheme to guide the approaching passenger to their assigned seat. In some cases, a passenger's mobile device may share GPS or other location information with the controller of vehicle 500 or with the carrier which transmits the location information to the controller of vehicle 500. The controller may then determine that a particular passenger is approaching and may send signals to lights 508-520 to display a color along a path to the assigned seat for the particular passenger that is approaching. Lights 508-520 may be configured to blink, blink more quickly, change pattern, or change to another color to confirm the passenger is in the correct place, once the passenger arrives at the assigned seat.

In some embodiments as shown in FIG. 5A, the determined color may be displayed by lights 508 showing a path that a passenger should follow to their assigned seat. Further, as shown in FIG. 5B lights 516 and 520 may be configured to illuminate the assigned seat and surrounding area. A different color may be displayed by lights 510, 512, and 514 to guide the passenger away from areas that are not the passenger's assigned seat, including other seats, cargo areas, and operator areas. In some embodiments, a path indicated by lights 508 may not be the most direct path but may be designed for optimal loading of vehicle 500 to reduce congestion, bottlenecks, and waiting in queues. Faster loading times may be achieved using optimized loading by indicating which paths passengers should follow to load the vehicle 500. In some cases, a proper and safe weight distribution for vehicle 500 may be maintained by loading passengers in a particular order, including simultaneously. This may be achieved by directing passengers to different doors of vehicle 500 during loading or via different paths on the vehicle 500 using lights 508-520.

Figure 6:
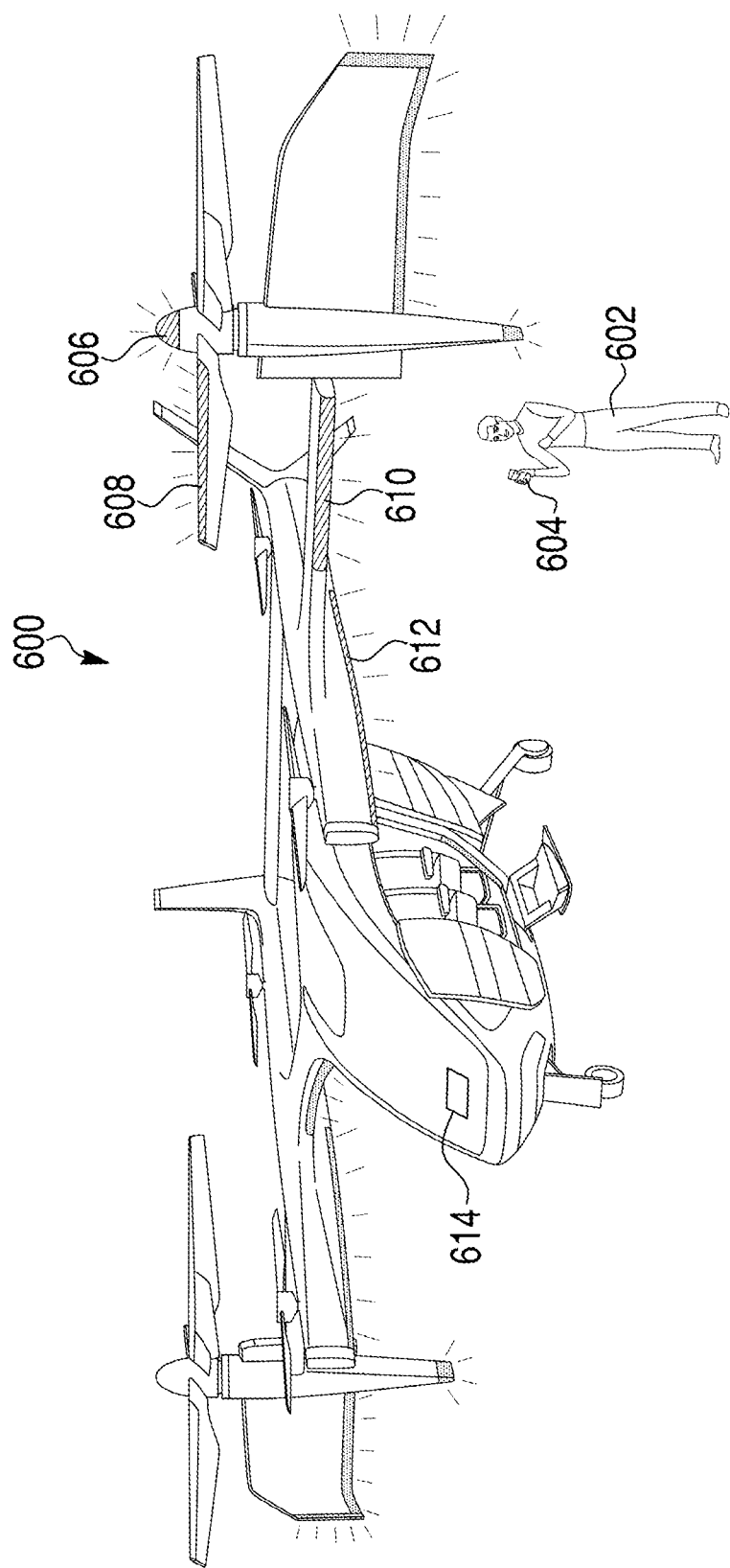
FIG. 6 illustrates a perspective view of an exemplary vehicle with lights that guide maintenance personnel to a malfunctioning component, in accordance with one or more embodiments.

FIG. 6 illustrates an exemplary vehicle 600 with lights that guide maintenance personnel to a malfunctioning component, in accordance with one or more embodiments. Vehicle 600 may be an example of vehicle 100 and may include all the features and lights of vehicle 100, although not all lights may be shown or discussed with reference to FIG. 6. For example, as shown in FIG. 6, vehicle 600 may include lights 606-612, which are configured to guide a repair person 602 to a malfunctioning component of vehicle 600.

Vehicle 600 may include one or more systems including, for example sensors, processors, communication devices, etc., that detect malfunctions within any of the components of vehicle 600. When a malfunction is detected, the malfunction detection system may determine which component of the vehicle 600 is malfunctioning and generate an alert or notification to maintenance personnel (e.g., provide an alert or notification to a mobile device 604 associated with a repair person) that a particular component is malfunctioning or needs attention. The malfunction detection system may be in communication with a lights controller 614 of vehicle 600 and may transmit the location of the malfunctioning component to the lights controller of vehicle 600. The lights controller may also be in communication with mobile device 604 associated with maintenance personnel and may transmit a determined color (e.g., a color determined in a manner similar to that discussed above with reference to FIG. 5) to mobile device 604, which displays the determined color indicating a path to follow to the malfunctioning component. The lights controller may also transmit signals to guide the repair person to the malfunctioning component using techniques in accordance with one or more disclosed embodiments.

For example, the malfunction detection system may determine that a blade 608 needs attention and/or is malfunctioning (e.g., blade 608 may need routine pre-flight checks or blade 608 may have electrical irregularities, accumulated wear, or rotational imbalances). The malfunction detection system may transmit the location of blade 608 to the lights controller which determines a color that is to be sent to mobile device 604. The lights controller also transmits signals to lights 606-612 to execute a lighting scheme to illuminate a path using the same color transmitted to mobile device 604, directing a repair person associated with mobile device 604 to blade 608 that is malfunctioning or needs attention. In some embodiments, others lights on vehicle 600 may be illuminated in a different color or pattern, or may not be illuminated at all. Additionally, the embodiment shown in FIG. 6 may be combined with any other disclosed embodiments, such as those discussed with reference to FIGS. 3 and 4. For example, a path to a malfunctioning component may be projected onto the ground or lights 606-612 may pulse in a sequence that shows simulated movement of lights toward the malfunctioning blade 608. In some examples, one or more light colors may be reserved for maintenance needs, such that maintenance and operation crews can quickly identify a maintenance need.

Figure 7:
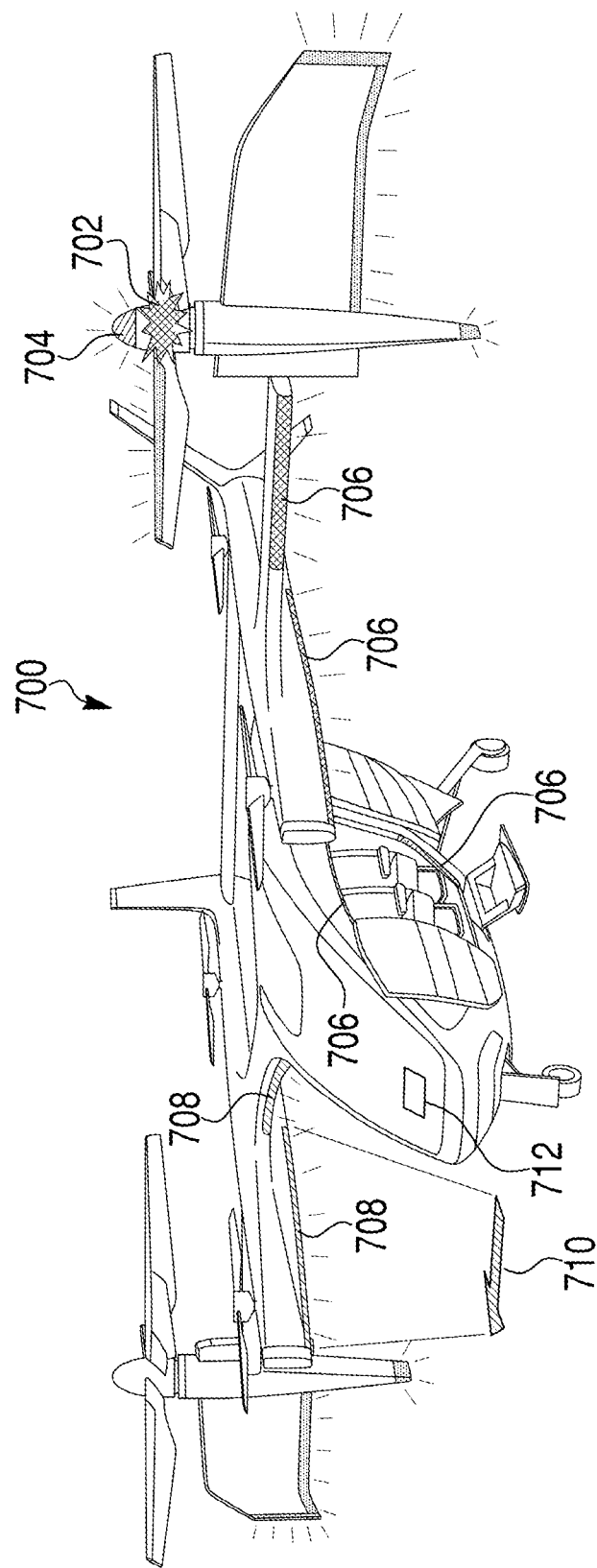
FIG. 7 illustrate a perspective view of an exemplary vehicle with lights that guide individuals away from a detected issue, in accordance with one or more embodiments.

FIG. 7 illustrates an exemplary vehicle 700 with lights that guide individuals away from issues with vehicle 700, in accordance with one or more embodiments. Vehicle 700 may be an example of vehicle 100 and may include all the features and lights of vehicle 100, although not all lights may be shown or discussed with reference to FIG. 7. For example, as shown in FIG. 7, vehicle 700 may include lights 704-708, which are configured to execute a lighting scheme to guide individuals away from a detected issue.

Vehicle 700 may include an issue detection system that detects issues with vehicle 700 that should be avoided by passengers. For example, a malfunction 702 may occur in one of the motors, as shown in FIG. 7. Issues may include failures and malfunctions associated with motors, electrical systems, hydraulic systems, and fuel systems. A lights controller 712 may be in communication with the issue detection system and may be configured to transmit signals to lights 706 and 708 to display colors and patterns that will guide passengers away from detected issues. In some cases, the same colors and patterns that are displayed by lights 706 and 708 may be used by emergency or maintenance personnel as guidance toward the detected issue (e.g., motor malfunction 702), such that the emergency personnel may eliminate or mitigate the issue (e.g., address the motor malfunction 702). The issue may be indicated by lights 704, which may be the closest lights to the motor malfunction 702. In some instances, one or more embodiments discussed with reference to other figures may be combined. For example, an image 710 of a green arrow may be projected onto the ground to direct passengers away from motor malfunction 702.

Figure 8:
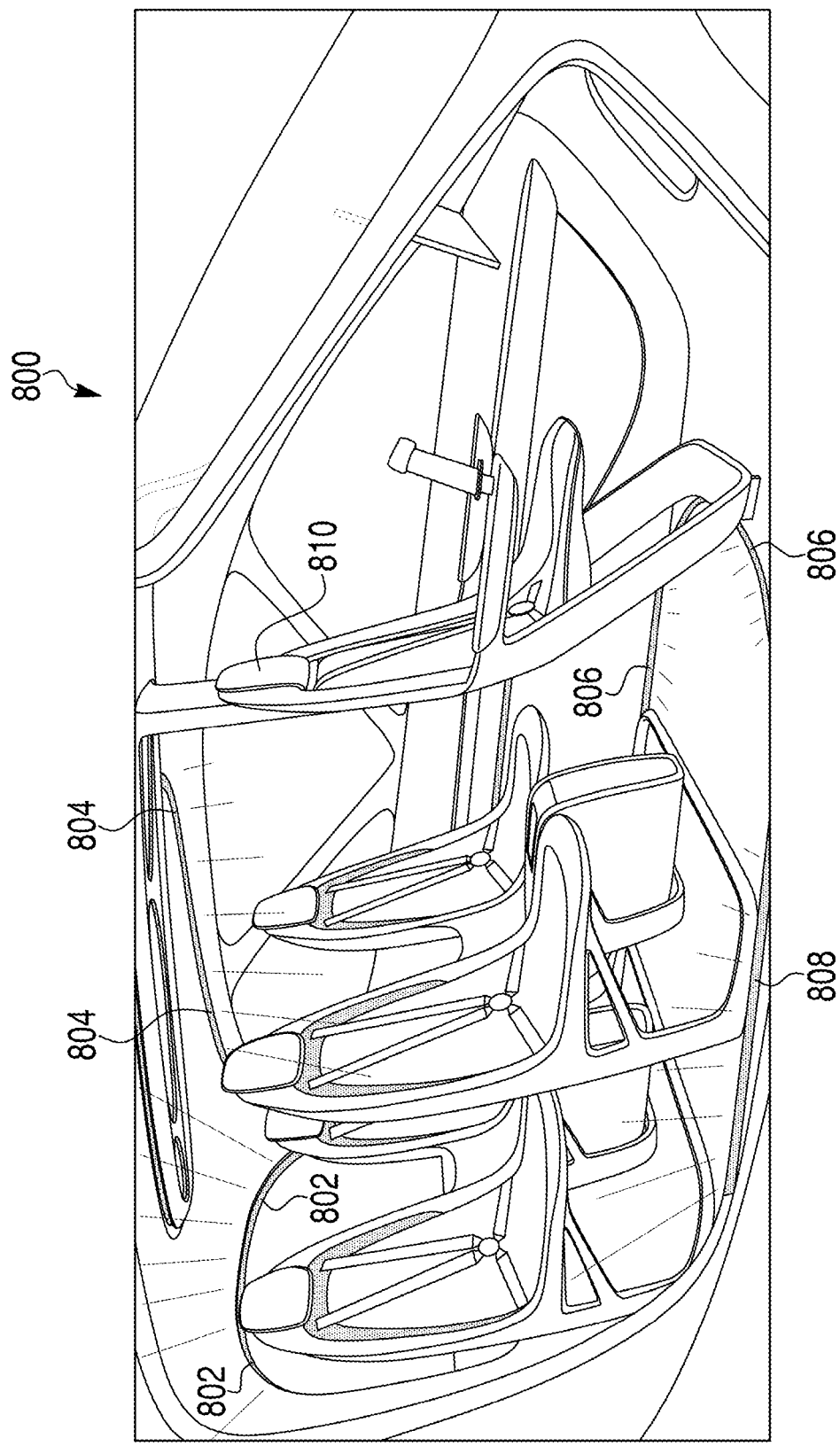
FIG. 8 illustrates a side view of an exemplary vehicle lighting configuration, according to one or more embodiments.

FIG. 8 illustrates an exemplary vehicle lighting configuration, according to one or more embodiments. Cabin 800 may be an example of cabin 200, and may include all the features and lights of cabin 200, although not all lights may be shown or discussed with reference to FIG. 8. For example, as shown in FIG. 8, cabin 800 may include lights 802-808, which are configured to execute a lighting scheme to be automatically more intense near the aft portion of the cabin 800 and automatically less intense near the fore portion of the cabin 800 (e.g., near the operator seat 810). Intense lights may be distracting and/or dangerous for an operator of a vehicle, such as vehicle 100. A lights controller may send signals to lights 806 to be less intense than lights 802 since lights 806 are closer to operator seat 810 and lights 802 are near the back of the cabin 800, away from operator seat 810. Additionally, lights 804 and 808 may be configured to increase in intensity according to an increase in distance from operator seat 810. Lights 802-808 may be dimmed (e.g., reduced in intensity) using pulse width modulation (PWM) or any other suitable technique to dim lights.

Figure 9:
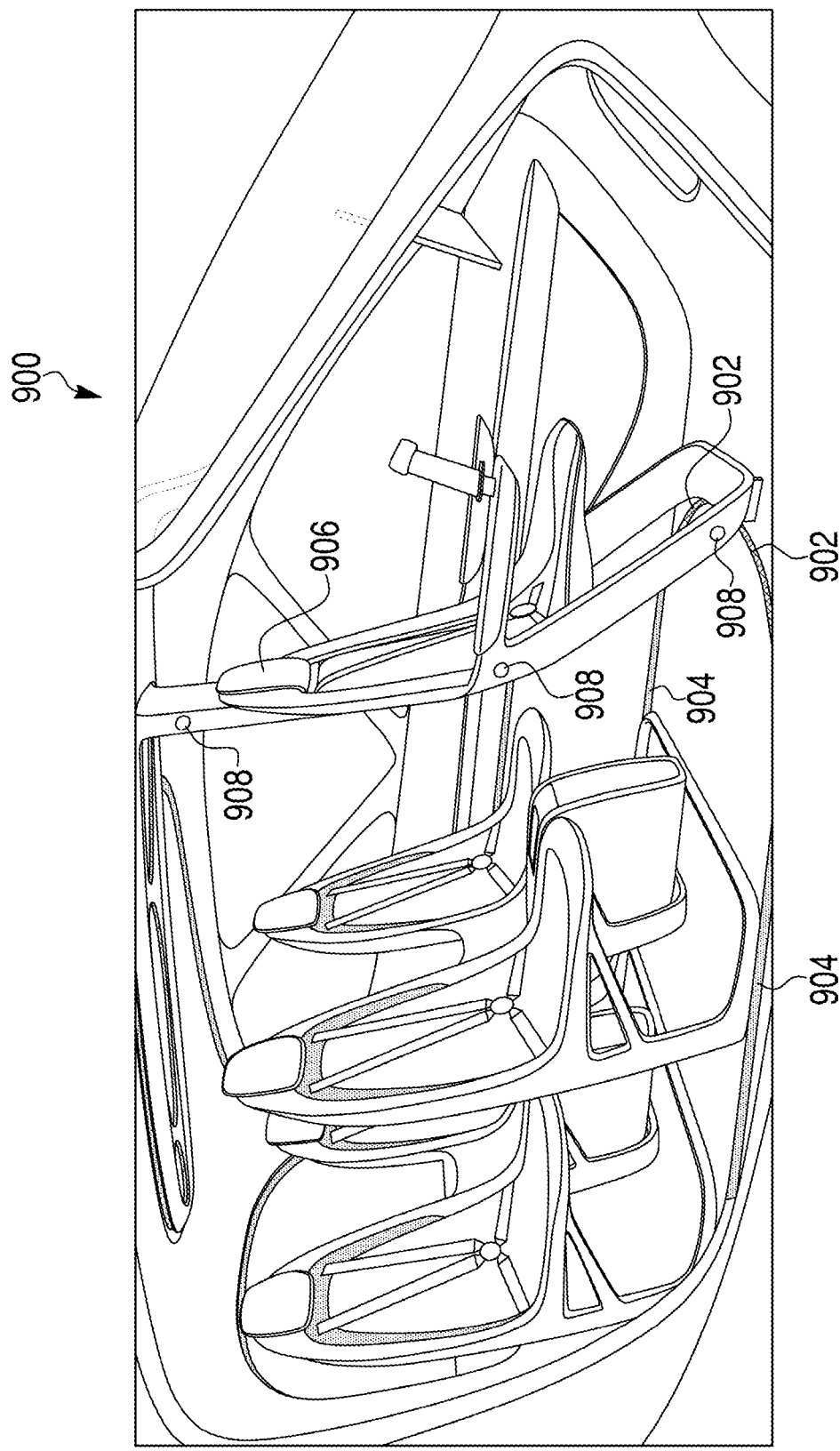
FIG. 9 illustrates a side view of an exemplary vehicle lighting configuration, according to one or more embodiments.

FIG. 9 illustrates an exemplary vehicle lighting configuration, according to one or more embodiments. Cabin 900 may be an example of cabin 200, and may include all the features and lights of cabin 200, although not all lights may be shown or discussed with reference to FIG. 9. For example, as shown in FIG. 9, cabin 900 may include lights 902 and 904. Lights 902 may be red while lights 904 may be any other color. Red lights near operator seat 906 may be safer as they do not reduce the night vision ability of an operator. Accordingly, because lights 902 are closer to operator seat 906, lights 902 are configured to be red. In some embodiments, lights 902 and 904 may execute a lighting scheme to change color gradually (e.g., change from red to another color) according to an increasing distance from operator seat 906. For example, while not shown, lights 902 may be red, but lights 904 may be red at the portions nearest to operator seat 906 but may change to be a different color (e.g., white) in accordance with an increasing distance from operator seat 906. Lights 902 may also be red or another color to separate or partition an area for the operator and an area for passengers. Sensors 908 may be configured to detect when a passenger approaches a restricted area in cabin 900 (e.g., an area reserved for an operator). Lights 902 may blink faster when a passenger approaches to warn the passenger that they are approaching a restricted area.

Figure 10A:
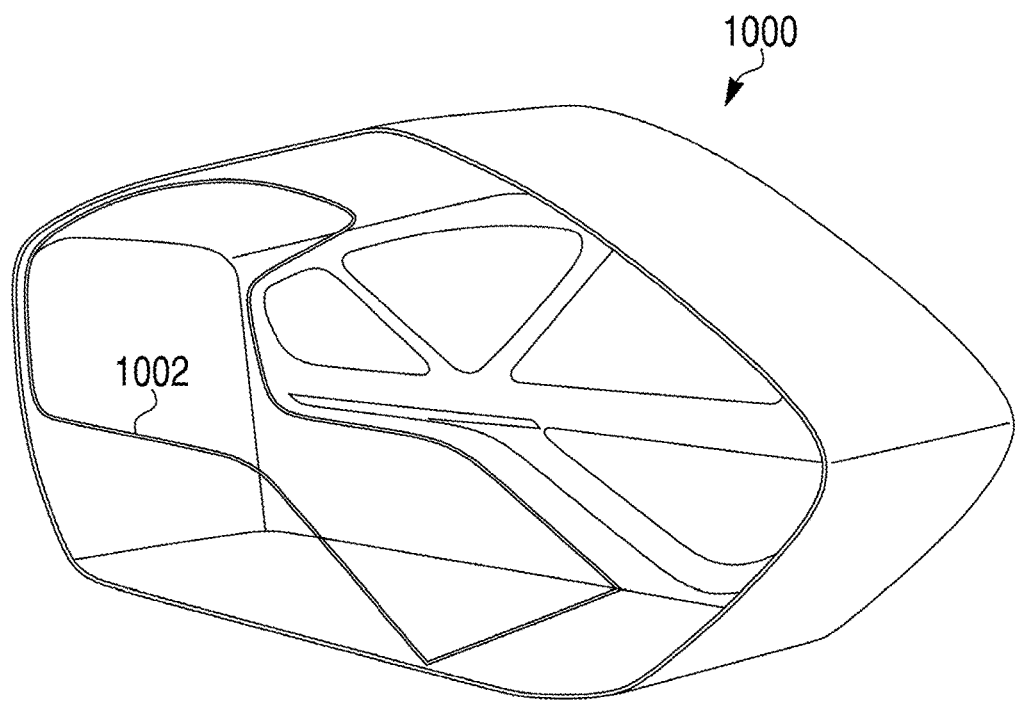
FIGS. 10A and 10B illustrate side perspective views of an exemplary vehicle lighting system within a cabin, according to some embodiments of the present disclosure.
Figure 10B:
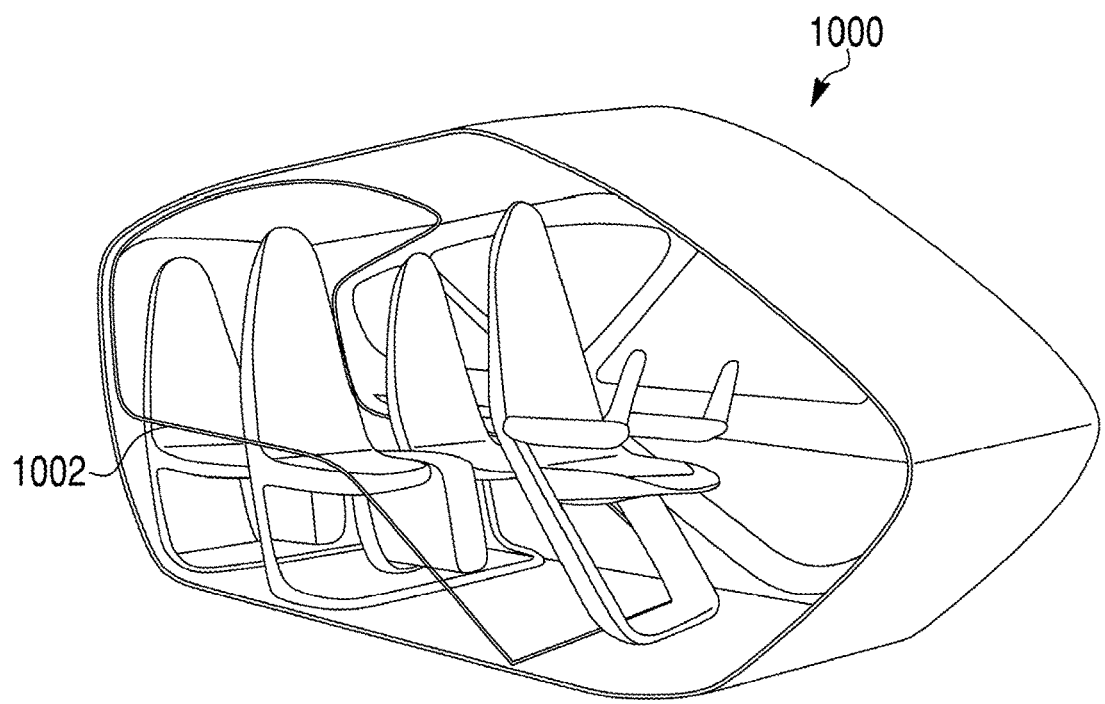

FIGS. 10A and 10B illustrate an exemplary vehicle lighting system within cabin 1000, according to some embodiments of the present disclosure. Cabin 1000 may be similar to cabin 200 with seats omitted as shown in FIG. 10A, or with seats included as shown in FIG. 10B. Cabin 1000 may include lights 1002. Lights 1002 may extend from a floor to a back portion and to a ceiling of cabin 1000, and may provide light for visibility to cabin 1000. For example, lights 1002 may be disposed around one or more seats 202.

Figure 11:
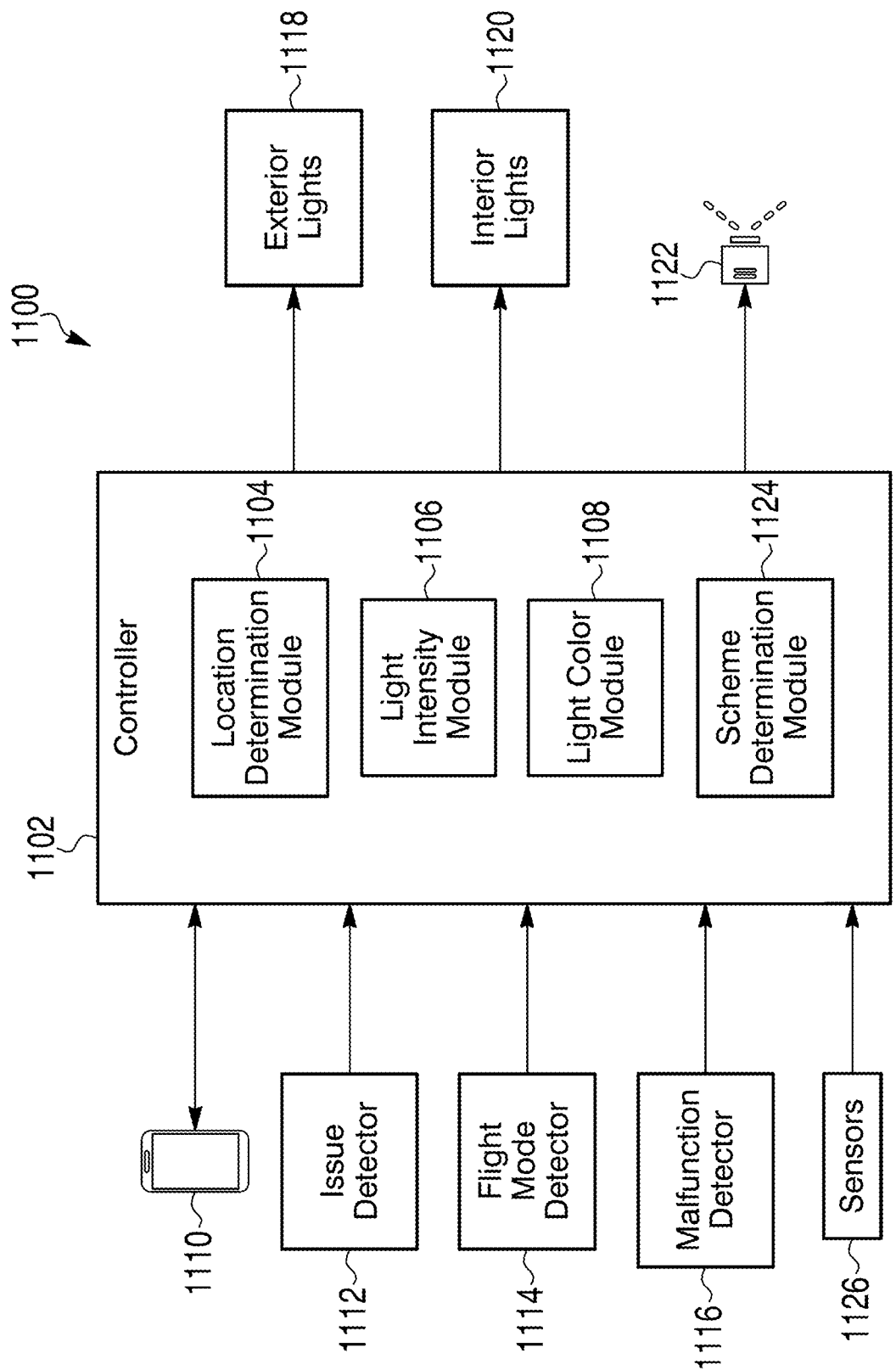
FIG. 11 is a block diagram depicting an exemplary system for lighting a vehicle, in accordance with one or more embodiments of the present disclosure.

FIG. 11 is a block diagram depicting a system 1100 for lighting a vehicle, in accordance with one or more embodiments of the present disclosure. System 1100 includes a controller 1102 that receives inputs from mobile device 1110, issue detector 1112, flight mode detector 1114, malfunction detector 1116, and sensors 1126. Controller 1102 provides outputs to exterior lights 1118, interior lights 1120, and projection lights 1122. Controller 1102 may include one or more modules including a location determination module 1104, a light intensity module 1106, a light color module 1108, and a scheme determination module 1124.

Exterior lights 1118 may include lights 116-134 of FIG. 1, or any other exterior lights (e.g., lights not within a cabin of a vehicle) shown in any of the previous figures. Interior lights 1120 may include lights 206-216 of FIG. 2, or any other interior lights within a cabin of a vehicle. Projection lights 1122 may include lights 302 and 306 of FIG. 3, or lights 708 of FIG. 7 that are configured to project images onto another surface, such as the ground.

Mobile device 1110 may be an example of mobile device 506 of FIG. 5 or a mobile device 604 of FIG. 6. Mobile device 1110 may be a smartphone, watch, tablet, laptop, or other mobile computing device that is associated with an individual that is to be guided by exterior lights 1118 or interior lights 1120. Issue detector 1112 may be a component of vehicle 100 that is configured to detect issues with vehicle 100, as discussed above with respect to FIG. 7. Flight mode detector 1114 may be a component of vehicle 100 that is configured to determine a flight mode. A flight mode may include stationary (e.g., parked), take-off, landing, during approach, during cruise, boarding, or disembarking. Other flight modes may include modes or statuses associated with issues detected by issue detector 1112 or malfunctions detected by malfunction detector 1116. Malfunction detector 1116 may detect failures and malfunctions of components of vehicle 100 (e.g., mechanical, electrical, hydraulic, structural components, etc.). Each of issue detector 1112, flight mode detector 1114, and malfunction detector 1116 may generate signals for controller 1102 independently of the other detectors, even if the main cause for all the signals is the same. By way of example, a motor of vehicle 100 may fail or malfunction during cruise, at which point controller 1102 may receive an indication from each of issue detector, flight mode detector 1114, and malfunction detector 1116. Controller 1102 may receive these inputs, synthesize them to determine a common cause for the input signals, and generate a lighting scheme to be output to exterior lights 1118, interior lights 1120, and in some cases, projection lights 1122.

Location determination module 1104 may determine a location of interest where an individual is to be guided. For example, controller 1102 may receive a communication from mobile device 1110 associated with a passenger, the communication including a seating assignment. Location determination module 1104 may determine a seating location for the passenger based upon the seating assignment. As another example, controller 1102 may receive a signal from malfunction detector 1116 that a particular component of vehicle 100 is malfunctioning and is in need of attention and/or repair. Location determination module 1104 may determine an approximate location of the malfunctioning component. In any of these examples, location determination module may use a lookup table (LUT) to determine a location of interest. For example, a seating location LUT may have a location for each seat programmed and mapped to a seat number and aisle. Further, a component LUT may include approximate locations for any component in the vehicle for which a malfunction may be detected.

Location determination module 1104 may also include an ability to determine a location of an individual such that a path between the individual and the location of interest may be determined. For example, controller 1102 may receive location information from mobile device 1110 of an approaching passenger or repair person, and use the location information to determine an optimal path that should be lighted such that the individual is guided to the location of interest. Location determination module 1104 may also receive signals from various sensors 1126 (e.g., proximity sensors, motion sensors, wireless communication or other information from mobile device 1110, etc.) that indicate an approximate location of individuals near or on the vehicle.

Light intensity module 1106 may determine an intensity that each individual lighting element of vehicle 100 is to be set. For example, controller 1102 may receive a signal from flight mode detector 1114 of a cruise flight mode. Responsive to this signal, light intensity module 1106 may determine that a one or more lights should be reduced in intensity so as to avoid distracting an operator, and disturbing the night vision of the operator.

Light color module 1108 may determine a color setting for one or more lights at a given time. For example, controller 1102 may receive a signal from issue detector 1112 that a particular issue is present in a particular portion of cabin 200. Responsive to the signal from issue detector 1112, light color module 1108 may determine that lights surrounding the area associated with the issue should be red so as to warn individuals of the present issue. Light color module 1108 may also determine that a path away from the area associated with the detected issue is to be illuminated in green lights such that individuals may know to avoid the area associated with the issue.

Scheme determination module 1124 may communicate with location determination module 1104, light intensity module 1106, and/or light color module 1108 to determine a lighting scheme for exterior lights 1118, interior lights 1120, or projection lights 1122. For example, scheme determination module 1124 may determine which lights should be illuminated, at which times, with which colors, and at which intensities. In some examples, scheme determination module 1124 may determine a timing for a light sequence or pattern in coordination with the other modules in controller 1102.

Figure 12:
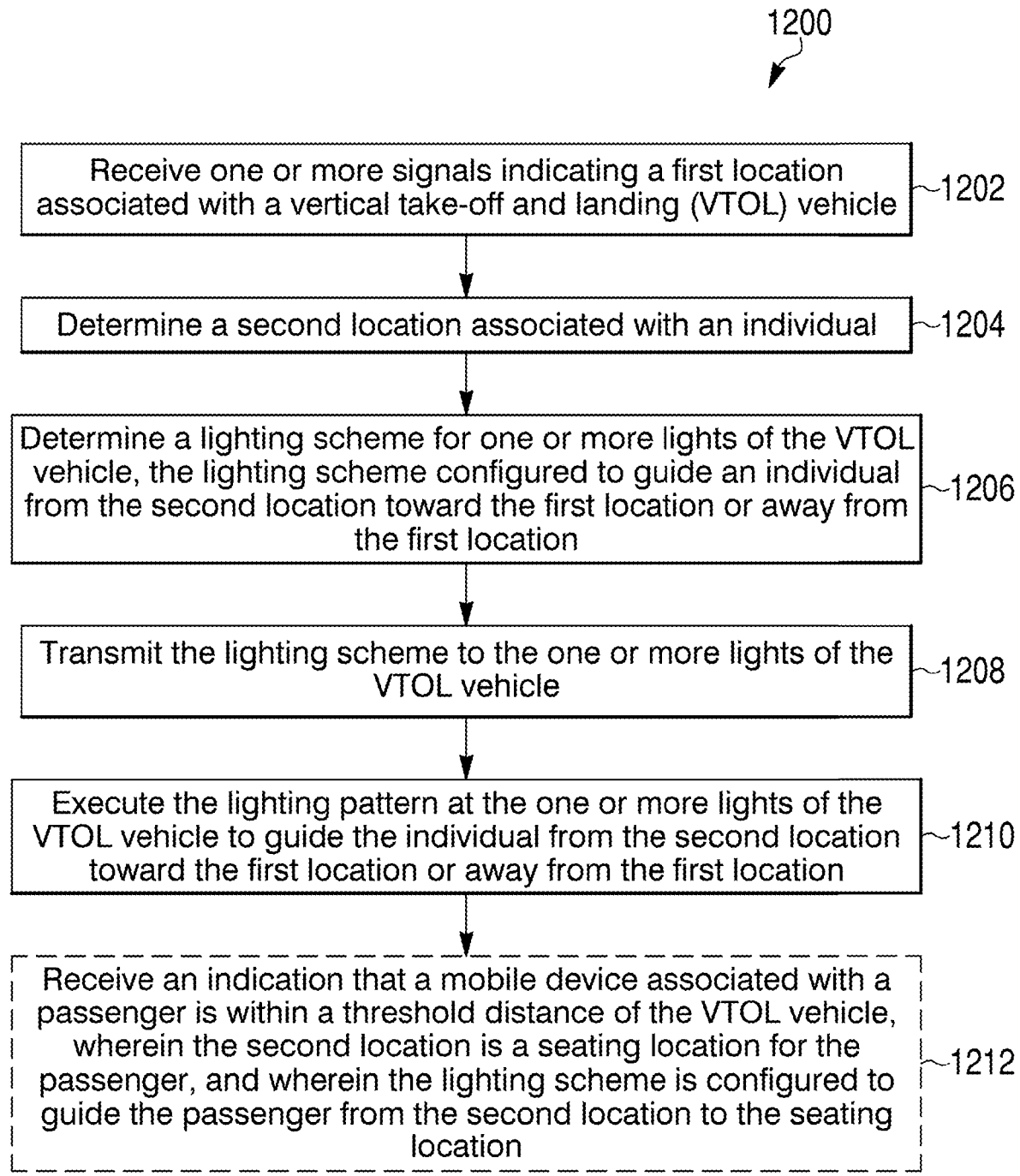
FIG. 12 is a flowchart depicting an example method of controlling a lighting system, in accordance with one or more embodiments.

FIG. 12 is a flowchart depicting an example method 1200 of controlling a lighting system, in accordance with one or more embodiments. At operation 1202, method 1200 includes receiving one or more signals indicating a first location associated with a VTOL vehicle. For example, operation 1202 may be performed by receiving location information at location determination module 1104 of controller 1102 from any one of issue detector 1112, flight mode detector 1114, malfunction detector 1116, and sensors 1126, as described above with respect to FIG. 11. Operation 1202 may also be performed by receiving seating location data from mobile device 506 associated with passenger 504, as described above with respect to FIG. 5.

At operation 1204, method 1200 includes determining a second location associated with an individual. For example, operation 1204 may be performed by receiving location information at location determination module 1104 of controller 1102 from mobile device 1110, as described above with respect to FIG. 11. Operation 1204 may also be performed by receiving location information from mobile device 506 identifying a location of mobile device 506, as described above with respect to FIG. 5.

At operation 1206, method 1200 includes determining a lighting scheme for one or more lights of the VTOL vehicle, the lighting scheme configured to guide an individual from the second location toward the first location or away from the first location. For example, operation 1206 may be performed by scheme determination module 1124 of controller 1102, as described above with respect to FIG. 11. As additional examples, operation 1206 may be performed by any one of controller 142, controller 614, or controller 712, as described above with respect to FIG. 1, FIG. 6, and FIG. 7, respectively.

At operation 1208, method 1200 includes transmitting the lighting scheme to the one or more lights of the VTOL vehicle. For example, operation 1208 may be performed by transmitting signals from controller 1102 to one of exterior lights 1118, interior lights 1120, or projection lights 1122, as described above with respect to FIG. 11. As an additional example, operation 1208 may be performed by transmitting signals from controller 614 to lights 606-612, as described above with respect to FIG. 6 or from controller 712 to lights 704-708, as described above with respect to FIG. 7.

At operation 1210, method 1200 includes executing the lighting scheme at the one or more lights of the VTOL vehicle to guide the individual from the second location toward or away from the first location. For example, operation 1210 may be performed by one or more of exterior lights 1118, interior lights 1120, and projection lights 1122, as described above with respect to FIG. 11, or by lights 116-134 as described above with respect to FIG. 1.

At operation 1212, method 1200 optionally includes receiving an indication that a mobile device associated with a passenger is within a threshold distance of the VTOL vehicle, wherein the second location is a seating location for the passenger, and wherein the lighting scheme is configured to guide the passenger from the second location to the seating location. For example, operation 1212 may be performed by receiving signals at controller 1102 from mobile device 1110, as described above with respect to FIG. 11, or by receiving signals from mobile device 506 associated with passenger 504, as described above with respect with FIG. 5. In some embodiments, the seating location may be determined by receiving seating location data from the mobile device associated with the passenger. For example, the mobile device may derive an assigned seat number from an electronic boarding pass and transmit the assigned seat number to the VTOL vehicle lighting controller. Method 1200 may further include transmitting a first signal indicating a lighting color to the mobile device, wherein the lighting scheme includes illuminating a path to the seating location using the lighting color.

Figure 13:
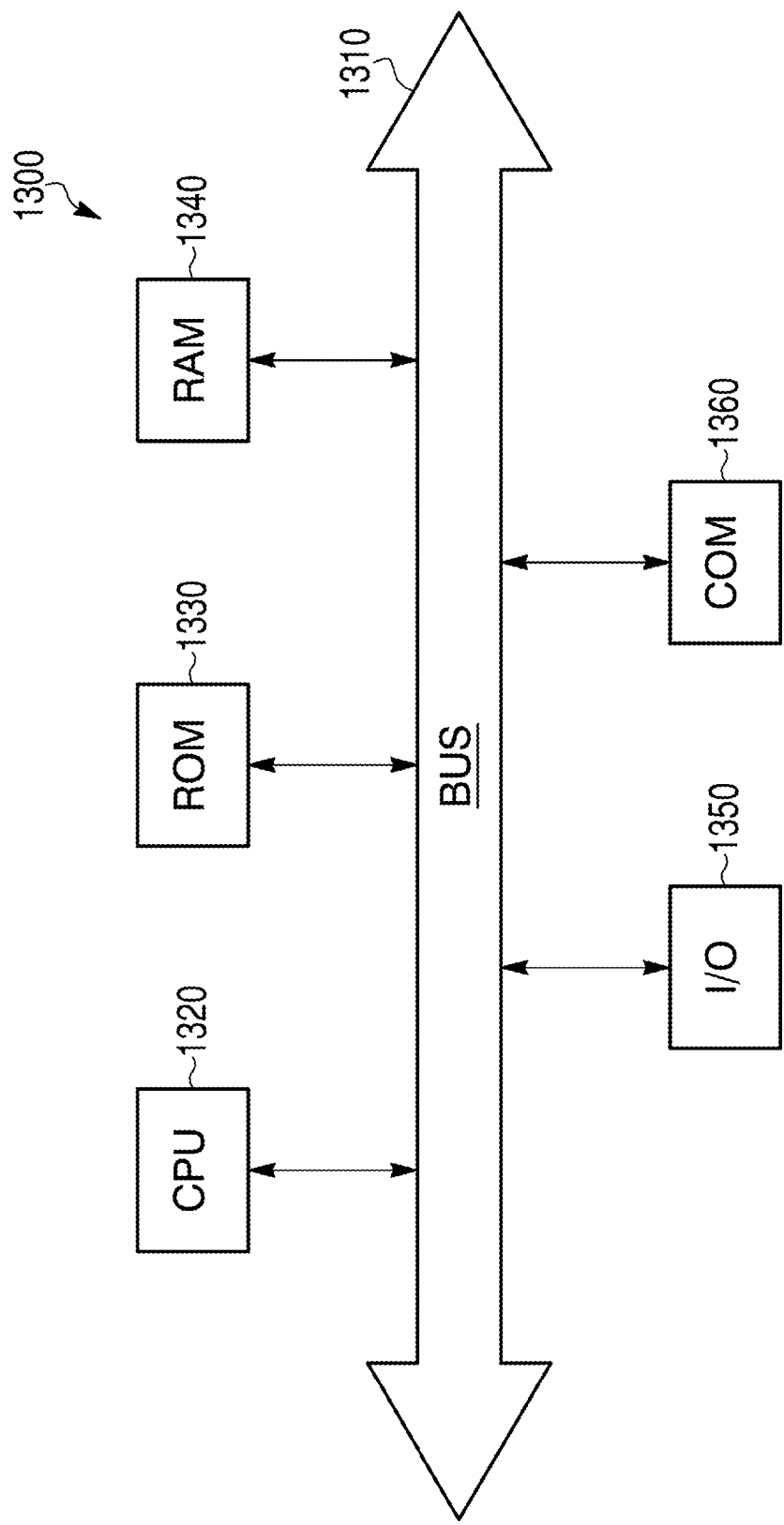
FIG. 13 illustrates an example device that may execute techniques presented herein.

FIG. 13 illustrates an example device 1300 that may execute techniques presented herein. For example, device 1300 of FIG. 13 may be used to perform processes related to controller 1102 of FIG. 11. Device 1300 may include a central processing unit (CPU) 1320. CPU 1320 may be any type of processor device including, for example, any type of special purpose or a general-purpose microprocessor device. As will be appreciated by persons skilled in the relevant art, CPU 1320 also may be a single processor in a multi-core/ multiprocessor system, such system operating alone, or in a cluster of computing devices operating in a cluster or server farm. CPU 1320 may be connected to a data communication infrastructure 1310, for example a bus, message queue, network, or multi-core message-passing scheme.

Device 1300 may also include a main memory 1340, for example, random access memory (RAM), and also may include a secondary memory 1330. Secondary memory 1330, e.g. a read-only memory (ROM), may be, for example, a hard disk drive or a removable storage drive. Such a removable storage drive may include, for example, a floppy disk drive, a magnetic tape drive, an optical disk drive, a flash memory, or the like. The removable storage drive in this example reads from and/or writes to a removable storage unit in a well-known manner. The removable storage may include a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1330 may include similar means for allowing computer programs or other instructions to be loaded into device 1300. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 1300.

Device 1300 also may include a communications interface ("COM") 1360. Communications interface 1360 allows software and data to be transferred between device 1300 and external devices. Communications interface 1360 may include a modem, a network interface (such as an Ethernet card), a communications port, a PCMCIA slot and card, or the like. Software and data transferred via communications interface 1360 may be in the form of signals, which may be electronic, electromagnetic, optical or other signals capable of being received by communications interface 1360. These signals may be provided to communications interface 1360 via a communications path of device 1300, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 1300 may also include input and output ports 1350 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically can be grouped together to perform a function or group of related functions. Like reference numerals are generally intended to refer to the same or similar components. Components and modules may be implemented in software, hardware or a combination of software and hardware.

The tools, modules, and functions described above may be performed by one or more processors. "Storage" type media may include any or all of the tangible memory of the computers, processors, or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

It will be apparent to persons skilled in the art that various modifications and variations can be made to the disclosed structure. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present invention. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A lighting system for a vehicle, comprising:
a plurality of lights disposed on a vertical take-off and landing (VTOL) vehicle, the plurality of lights configured to turn on and off, change color, and/or change intensity; and
a controller configured to:
identify a malfunctioning component of the VTOL vehicle;
determine a lighting scheme for the plurality of lights, the lighting scheme comprising a setting for the plurality of lights, the setting including one or more of: turning the plurality of lights on or off, setting a color of the plurality of lights, and setting an intensity of the plurality of lights;
determine a location in or associated with the VTOL vehicle, wherein the lighting scheme is configured to guide a person to the location; and
transmit a signal to the one or more lights to execute the lighting scheme to guide the person to the determined location;
wherein the determined location is a location of the malfunctioning component; and
wherein the lighting scheme is configured to guide the person to the location of the malfunctioning component or to a separate location away from the location of the malfunctioning component.

2. The system of claim 1, wherein the lighting scheme includes a projection of an image indicating a direction toward the determined location.

3. The system of claim 1, wherein the lighting scheme includes a projection of a vehicle or flight identification number to aid passengers in identifying the vehicle.

4. A method for controlling a light system for a vehicle, comprising:
receiving one or more signals indicating a first location associated with a vertical take-off and landing (VTOL) vehicle;
receiving an indication that a mobile device associated with a passenger is within a threshold distance of the VTOL vehicle;

determining a second location associated with an individual, wherein the second location is a seating location for the passenger;

determining a lighting scheme for one or more lights of the VTOL vehicle, the lighting scheme configured to guide an individual from the second location toward the first location or away from the first location, wherein the lighting scheme is configured to guide the passenger from the second location to the seating location;

transmitting the lighting scheme to the one or more lights of the VTOL vehicle; and executing the lighting scheme at the one or more lights of the VTOL vehicle to guide the individual from the second location toward or away from the first location.

5. The method of claim 4, wherein the seating location for the passenger is determined by receiving seating location data from the mobile device associated with the passenger.

6. The method of claim 4, further comprising transmitting a first signal indicating a lighting color to the mobile device, wherein the lighting scheme comprises illuminating a path to the seating location using the lighting color.

7. A lighting system for a vehicle, comprising:
a plurality of lights disposed on a vertical take-off and landing (VTOL) vehicle, the plurality of lights configured to turn on and off, change color, and/or change intensity; and
a controller configured to:
identify a component of the VTOL vehicle in need of maintenance;
determine a lighting scheme for the plurality of lights, the lighting scheme comprising a setting for the plurality of lights, the setting including one or more of: turning the plurality of lights on or off, setting a color of the plurality of lights, and setting an intensity of the plurality of lights;
determine a location in or associated with the VTOL vehicle, wherein the lighting scheme is configured to guide a person to the location, wherein the determined location is a location of the component in need of maintenance; and
transmit a signal to the one or more lights to execute the lighting scheme to guide the person to the determined location, wherein the lighting scheme is configured to guide a person to the location of the component in need of maintenance or to a separate location away from the location of the component in need of maintenance.

8. A lighting system for a vehicle, comprising:
a plurality of lights disposed on a vertical take-off and landing (VTOL) vehicle, the plurality of lights configured to turn on and off, change color, and/or change intensity; and
a controller configured to:
determine a lighting scheme for the plurality of lights, the lighting scheme comprising a setting for the plurality of lights, the setting including one or more of: turning the plurality of lights on or off, setting a color of the plurality of lights, and setting an intensity of the plurality of lights;
determine a location in or associated with the VTOL vehicle, wherein the lighting scheme is configured to guide a person to the location; and
transmit a signal to the one or more lights to execute the lighting scheme to guide the person to the determined location, wherein the one or more lights comprises a series of lights in a row, and wherein the lighting scheme comprises turning on each light in the series of lights in succession, indicating a direction for the person to follow.

9. The system of claim 8, wherein the lighting scheme comprises a light closer to a location having a greater intensity than a light more distant from the location.

10. A lighting system for a vehicle, comprising:
a plurality of lights disposed on a vertical take-off and landing (VTOL) vehicle, the plurality of lights configured to turn on and off, change color, and/or change intensity; and
a controller configured to:
determine a lighting scheme for the plurality of lights, the lighting scheme comprising a setting for the plurality of lights, the setting including one or more of: turning the plurality of lights on or off, setting a color of the plurality of lights, and setting an intensity of the plurality of lights;
determine a location in or associated with the VTOL vehicle, wherein the lighting scheme is configured to guide a person to the location; and
transmit a signal to the one or more lights to execute the lighting scheme to guide the person to the determined location;
wherein the lighting scheme includes illuminating one or more lights with a first light color to show a path to an open seat, and illuminating one or more lights with a second light color to show a path to an occupied seat.

11. A lighting system for a vehicle, comprising:
a plurality of lights disposed on a vertical take-off and landing (VTOL) vehicle, the plurality of lights configured to turn on and off, change color, and/or change intensity; and
a controller configured to:
receive one or more signals from a mobile device;
determine a lighting scheme for the plurality of lights, the lighting scheme comprising a setting for the plurality of lights, the setting including one or more of: turning the plurality of lights on or off, setting a color of the plurality of lights, and setting an intensity of the plurality of lights;
determine a location in or associated with the VTOL vehicle, wherein the lighting scheme is configured to guide a person to the location, wherein the determined location is a seating location in the VTOL vehicle for a passenger associated with the mobile device based on the one or more signals from the mobile device; and
transmit a signal to the one or more lights to execute the lighting scheme to guide the person to the determined location, wherein the lighting scheme is configured to guide the passenger associated with the mobile device to the seating location in the vehicle.

12. The system of claim 11, wherein the controller is configured to:
determine a color to be displayed on the mobile device; and
transmit a signal to the one or more lights to execute the lighting scheme comprising illuminating the seating location and a path toward the seating location with the determined color.

* * * * *